United States Patent
Bar-Ness et al.

(10) Patent No.: US 7,286,514 B2
(45) Date of Patent: Oct. 23, 2007

(54) METHOD FOR PHASE NOISE SUPPRESSION FOR OFDM BASED WLANS

(75) Inventors: Yeheskel Bar-Ness, Marlboro, NJ (US); Songping Wu, North Arlington, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 743 days.

(21) Appl. No.: 10/731,693

(22) Filed: Dec. 8, 2003

(65) Prior Publication Data

US 2004/0171366 A1 Sep. 2, 2004

Related U.S. Application Data

(60) Provisional application No. 60/432,212, filed on Dec. 10, 2002.

(51) Int. Cl.
*H04Q 7/24* (2006.01)
*H04J 11/00* (2006.01)

(52) U.S. Cl. .................. 370/338; 370/203; 370/210; 375/346; 455/63.1; 455/296

(58) Field of Classification Search ............... 370/203, 370/210, 338, 908; 375/147, 148, 229, 254, 375/322, 346, 348; 455/63.1, 67.13, 295, 455/296

See application file for complete search history.

(56) References Cited

U.S. PATENT DOCUMENTS

| | | | |
|---|---|---|---|
| 6,549,561 B2 * | 4/2003 | Crawford | 375/326 |
| 6,594,320 B1 * | 7/2003 | Sayeed | 375/326 |
| 6,654,408 B1 * | 11/2003 | Kadous et al. | 375/148 |
| 6,956,893 B2 * | 10/2005 | Frank et al. | 375/346 |
| 7,012,882 B2 * | 3/2006 | Wang et al. | 370/203 |
| 2003/0185147 A1 * | 10/2003 | Taga et al. | 370/210 |

* cited by examiner

*Primary Examiner*—Quochien B. Vuong
(74) *Attorney, Agent, or Firm*—Connolly Bove Lodge & Hutz LLP

(57) ABSTRACT

Orthogonal frequency division multiplexing (OFDM) has been specified by IEEE 802.11a standard as the transmission technique for high-rate wireless local area networks (WLANs). Performance of an OFDM system, however, is heavily degraded by random Wiener phase noise, which causes both common phase error (CPE) and inter-carrier interference (ICI). A method and algorithm is disclosed for efficiently eliminating the effect of phase noise in OFDM based WLANs.

14 Claims, 3 Drawing Sheets

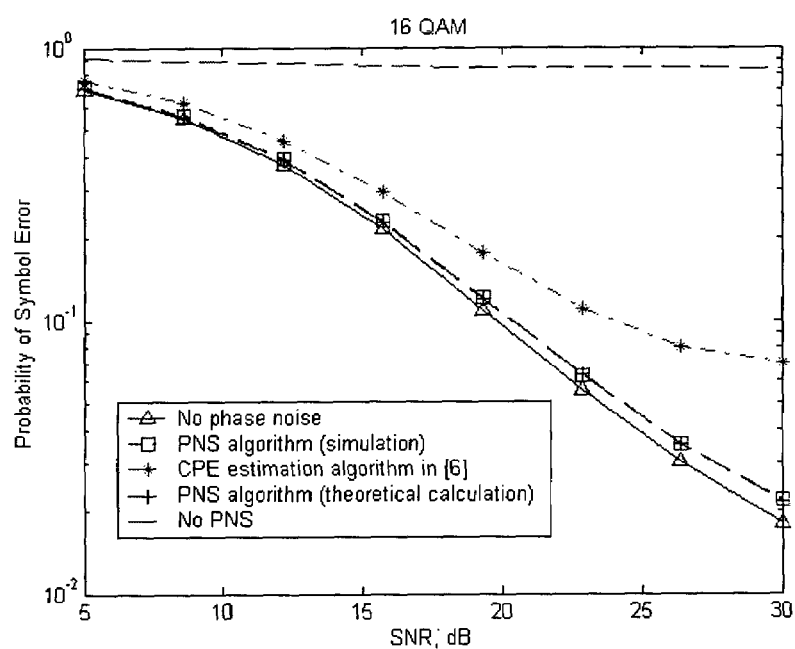
Fig.2. PNS algorithm performance for 16QAM, with phase noise energy $4\pi\beta T$ equal to 0.0384$rad^2$

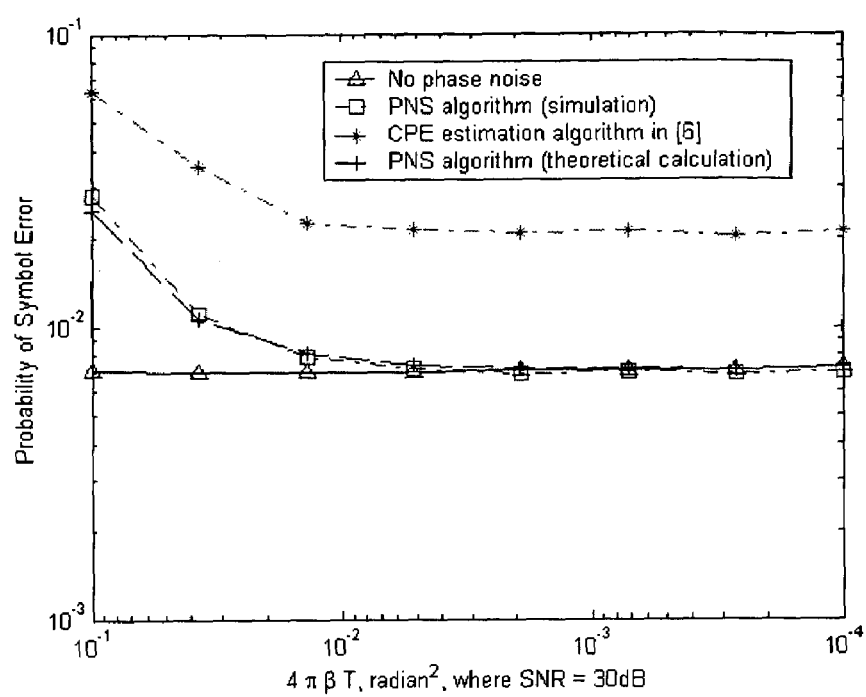
Fig.3. PNS algorithm, symbol error probability vs. phase noise energy $4\pi\beta T$

METHOD FOR PHASE NOISE SUPPRESSION FOR OFDM BASED WLANS

RELATED APPLICATION

This application claims priority from U.S. provisional patent application 60/432,212 filed Dec. 10, 2002.

FEDERALLY SPONSORED RESEARCH

Partial support for the present invention was provided by the National Science Foundation, and accordingly the U.S. Government may have certain license or other rights in the invention.

BACKGROUND OF INVENTION

Orthogonal frequency division multiplexing (OFDM) is a bandwidth efficient transmission technique which easily handles time dispersion of channel. It has been adopted by the IEEE 802.11a standard as the transmission technique for high-rate wireless local area networks (WLANs). See the supplement to IEEE standard for *Information Technology Telecommunications And Information Exchange Between Systems—Local And Metropolitan Area Networks Specific Requirements*. Part 11: wireless LAN Medium Access Control (MAC) and Physical Layer (PHY), *IEEE Std 802.11a*, December 1999. The data packet of the IEEE 802.11a standard consists of two parts: the preamble and the data. The preamble includes short and long pilots which are used, e.g., for synchronization, frequency offset and channel estimation. Pilot-aided OFDM channel estimation is discussed in O. Edfors, M. Sandell, J. V. D. Beek, S. Kate and P. O. Borjesson, "OFDM Channel Estimation By Singular Value Decomposition," IEEE Trans. Commun., vol. 46, no. 7, pp. 931-939, July 1998. Frequency offset corrections have been presented in many papers, including P. H. Moose, "A Technique For Orthogonal Frequency Division Multiplexing Frequency Offset Correction," *IEEE Trans. Commun.*, vol. 42, pp. 2908-2914, October 1994; and in M. A. Visser and Y. Bar-Ness, "OFDM Frequency Offset Correction Using An Adaptive Decorrelator," *CISS'32*, Princeton, N.J., pp. 483-488, March 1998. However, Wiener phase noise, the effect of which has also been examined in T. Pollet, M. V. Bladel and M. Moeneclaey, "BER Sensitivity Of OFDM Systems To Carrier Frequency Offset And Wiener Phase Noise," *IEEE Trans. Commun.*, vol. 43, no. 2, pp. 191-193, February 1995, proves to be a much more complex phenomenon than frequency offset. In the present invention what is termed a phase noise suppression (PNS) algorithm is used to eliminate the effect of this noise.

SUMMARY OF THE INVENTION

Now in accordance with the present invention, a method is provided for phase noise suppression in a receiver section of an OFDM based WLAN operating in accordance with IEEE standard 802.11(a). The null subcarrier set $S_N$ from Fast Fourier Transform (FFT) is used to estimate ICI (Intercarrier interference) plus noise energy, and the pilot subcarrier set $S_P$ from Fast Fourier Transform is used to estimate CPE (Common Phase Error). These estimates are applied to the Minimum Mean Square Error (MMSE) equalization of the data subcarrier set $S_D$. Preferably, the pilot subcarreir $S_P$ set is taken from MMSE equalization and data detection block of the circuitry as a first decision and fed back in a loop to the CPE estimater, to further improve the CPE estimate.

BRIEF DESCRIPTION OF THE DRAWINGS

In the drawings appended hereto:

FIG. 2 is a graph illustrating performance of the algorithm of the present invention and comparing the performance with the theoretical calculation and with that of a prior art algorithm (Robertson et al. op. cit.); and FIG. 3 is a graph further illustrating performance of the algorithm of the present invention for different phase noise conditions, and comparing the performance with the theoretical calculation and with that of a prior art algorithm (Robertson et al. op. cit.).

DESCRIPTION OF PREFERRED EMBODIMENT

Figure 1:
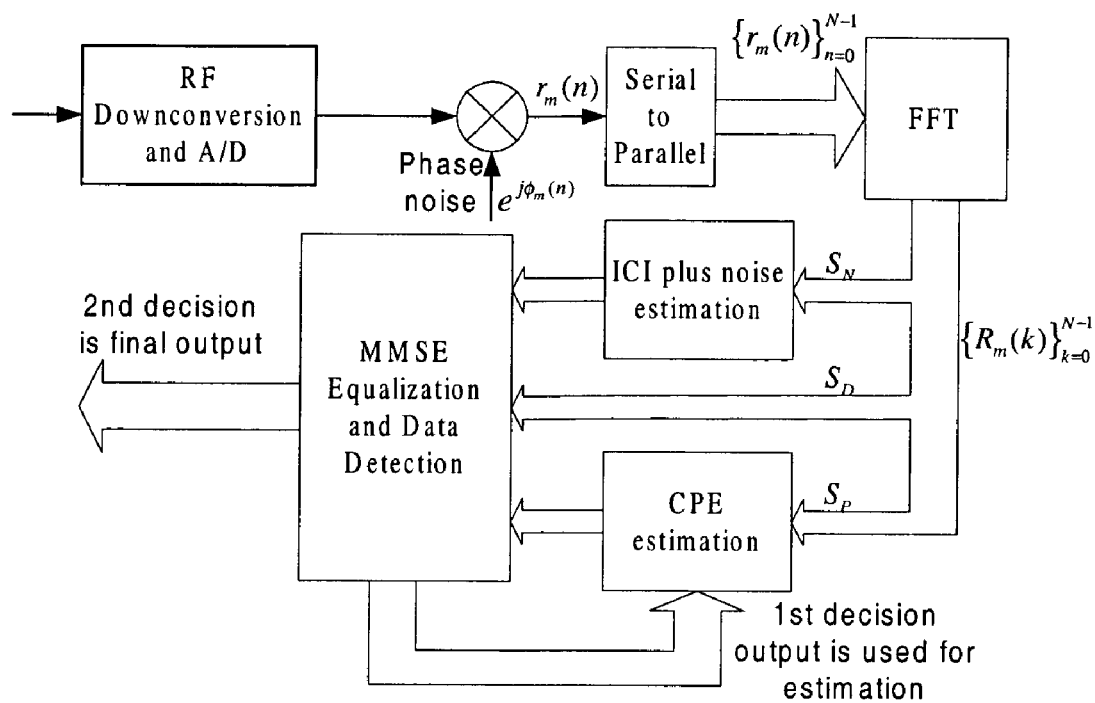
FIG. 1 is a schematic block diagram illustrating a receiver section of a WLAN operating in accordance with the invention.

Referring to FIG. 1, let $\varnothing_m(n)$ be the phase noise, the baseband signals the $r_m(n)$'s are the output of the down converted signals affected by phase noise. As a result, both common phase error (CPE) and inter-carrier interference (ICI) can be seen at the output of FFT, $\{R_m(k)\}k=0^{N-1}$ due to phase noise. In consideration of the IEEE 802.11a WLAN standard, the present invention uses the null subcarrier set $S_N$ to estimate ICI plus noise energy, and the pilot subcarrier set $S_P$ to estimate CPE. These estimates can therefore be applied to the MMSE equalization of the data subcarrier set $S_P$. Due to few pilots given in the IEEE 802.11a standard, the first decision output from MMSE Equalization and Data Detection can be fed back to further improve the CPE estimator performance by introducing a forgetting factor. By taking advantage in the present invention of null and pilot subcarriers, numerical results show that the present phase noise suppression (PNS) scheme approaches the non-phase-noise case while outperforming other schemes in the literature.

Assuming perfect frequency and timing synchronization, i.e., we need only take phase noise into consideration. The received nth sample of the mth OFDM symbol can be expressed by $$r_m(n) = x_m(n) h_m(n) \cdot e^{j\Phi_m(n)} + \zeta_m(n) \tag{1}$$

where $x_m(n), h_m(n)$ and $\Phi_m(n)$ denote the transmitted signal, the channel impulse response and the phase noise, respectively, while $\zeta_m(n)$ is the AWGN (Additive White Gaussian Noise) with variance or $\sigma^2$. After removing the cyclic prefix and taking the DFT (discrete Fourier transform), the resulting frequency domain signal is given by $$R_m(k) = X_m(k) H_m(k) I_m(0) + \sum_{\substack{l=-N/2 \\ l \neq k}}^{N/2-1} X_m(l) H_m(l) I_m(l-k) + \zeta_m(k) \tag{2}$$

where $x_m(k)$, $H_m(k)$ and $\zeta_m(k)$ are the corresponding frequency domain expressions of $x_m(n)$, $h_m(n)$ and $\zeta_m(n)$ respectively. $I_m(i)$ is a function of $\Phi_m(n)$ given by:

$$I_m(i) = \frac{1}{N} \sum_{n=-N/2}^{N/2-1} e^{j2\pi ni/N} e^{j\varphi_m(n)}, \; i = -N/2, \ldots, N/2 - 1 \tag{3}$$

From (2), we notice that random phase noise not only causes common phase error (CPE), i.e. the phase rotation of the desired sample, but also introduces inter-carrier interference (ICI). Therefore, it degrades receiver performance.

For the IEEE 802.11a standard, there are 64 (N=64) samples per symbol, including data sample set $S_D$ with $N_D$=48 samples, pilot sample set $S_P$ with $N_P$=4 samples, and null sample set $S_N$ with $N_N$=12 samples. An accurate channel estimate can be obtained using pilot preambles of the data packet (see Edfors et al., op. cit.), which can be further improved using two consecutive pilots with channel invariant during a packet period. Here we assume that channel frequency response is known within the whole packet.

The ICI, indicated by the second term in (2), is a random variable which is independent of $\zeta_m(k) \cdot X_m(k)$ can be treated as mutually independent random variables independent of $H_m(k)$ with zero mean and variance $E_x$. Therefore the ICI term in (2) has a zero mean. By choosing the appropriate exponential power delay profile (Supplement to IEEE standard; op. cit.,), the channel correlation $E[|H_m(k)|^2]$ is equal to 1. Furthermore, with the same method of Edfors et al., it can be shown that, for any power delay profiles, $E[|H_m(k)|^2]$ is constant which is independent of k. Hence, without loss of generality, we take herein $E[|H_m(k)|^2]$ as 1. We can also use from (T. Pollet, M. V. Bladel and M. Moeneclaey, "BER Sensitivity Of OFDM Systems To Carrier Frequency Offset And Wiener Phase Noise," *IEEE Trans. Commun.*, vol. 43, no. 2, pp. 191-193, February 1995) the following approximation which is improved when N is large enough, $$\sum_{\substack{l=0 \\ l \neq k}}^{N-1} E[|I_m(l-k)|^2] = 1 - E[|I_m(0)|^2] = 2\pi\beta T/3 \quad (4)$$

where $\beta$ is the one-sided 3 dB linewidth of the Lorentzian power density spectrum of the free running carrier generator, and T indicates the symbol period.

From (4) and the aforementioned discussion, we can obtain the approximation of the variance of the ICI term $$E\left[\left|\sum_{\substack{l=-N/2 \\ l \neq k}}^{N/2-1} X_m(l)H_m(l)I_m(l-k)\right|^2\right] = \quad (5)$$

$$\sum_{\substack{l=-N/2 \\ l \neq k}}^{N/2-1} E[|X_m(l)|^2]E[|H_m(l)|^2]E[|I_m(l-k)|^2] \cong 2\pi\beta T(N-N_N)E_x/(3N)$$

Thus we can write (2) as $$R_m(k) = X_m(k)H_m(k)I_m(0) + \epsilon_m(k) \quad (6)$$

where $\epsilon_m(k)$, the summation of the noise and ICI terms, is a random variable with zero mean and variance $\sigma_\epsilon^2(m,k)$. With approximation in (5), we note that $\sigma_\epsilon^2(m,k)$ keeps the same for $\forall k \in S_D$ and can be approximated by $\sigma_\epsilon^2(m)$. We also notice that $\sigma_\epsilon^2(m,k)$ can be different for $k \in S_N$, i.e., for the null subcarriers which acts as the guard band, since the analog bandpass filter before RF down conversion will color the AWGN within these subcarriers, but would hardly affect the ICI term caused by phase noise within these subcarriers. This is because phase noise occurs mainly due to the receiver oscillator after RF down conversion, rather than that caused by the transmitter oscillator.

By using the MMSE equalization, the transmitted data samples can be estimated by $$\hat{X}_m(k) = R_m(k) * C_m(k) \quad (7)$$

where $C_m(k)$ is obtained by the MMSE criterion as follows:

$$C_m(k) = \frac{I_m^*(0)H_m^*(k)}{|I_m(0)H_m(k)|^2 + \sigma_\epsilon^2(m)/E_x} \quad (8)$$

where $(\cdot)^*$ represents the conjugate operation. In the absence of phase noise, the MMSE equalizer for OFDM receiver can be further reduced to $$C_m(k) = \frac{H_m^*(k)}{|H_m(k)|^2 + \sigma^2/E_x} \quad (9)$$

Phase Noise Suppression (PNS) Algorithm

In order to implement (8), we have to know $I_m(0)$ and $\sigma_\epsilon^2$ first. It's very clear from (3) that, although $I_m(0)$ changes from symbol to symbol, it is the same for all the samples of symbol m and thus can be estimated by using pilot symbols. See P. Robertson and S. Kaiser, "Analysis Of The Effects Of Phase Noise In Orthogonal Frequency Division Multiplexing (OFDM) Systems," *ICC'95*, Seattle, vol. 3, pp. 1652-1657, 1995. Note that in Robertson et al., the phase of $I_m(0)$ was estimated separately from each pilot sample and averaged to get the final estimate, which is then used for CPE compensation. To avoid extra computation for obtaining the phase of $I_m(0)$, instead of its phase, we directly estimate $I_m(0)$ from each sample and use them to obtain the final estimate of $I_m(0)$. For the 802.11a standard, e.g., we can take advantage of 4 pilot samples within a symbol, at position −21, −7, 7 and 21. The least-squares (LS) method is applied to minimize the cost function $$\min_{I_m(0)} \sum_{k \in S_P} |R_m(k) - I_m(0)X_m(k)H_m(k)|^2 \quad (10)$$

which leads to the estimate $$\tilde{I}_m(0) = \frac{\sum_{k \in S_P} R_m(k)X_m^*(k)H_m^*(k)}{\sum_{k \in S_P} |X_m(k)H_m(k)|^2} \quad (11)$$

One may argue that (11) may not be accurate with so few numbers of pilot symbols. However, we can first use (11) to estimate $I_m(0)$; and, after equalization and detection, decision feedback is used for further enhancement of the performance of (11) by using $$\hat{I}_m(0)\gamma \tilde{I}_m(0) + (1-\gamma)\tilde{I}'_m(0) \quad (12)$$

where $\gamma$ is the forgetting factor. $\tilde{I}'_m(0)$ takes the same form of (11) except that the observations are replaced by the detection results of the data sample set $S_D$.

Before implementing the MMSE equalizer of (8), we have to know the ICI plus noise energy $\sigma_\epsilon^2(m)$. Using (5), the ICI energy (thus the ICI plus noise energy $\sigma_\epsilon^2(m)$) is approximated as being the same for different subcarriers, but difficult to be obtained in practice since we do not know $\beta$ and $\sigma^2$. The question is then whether it is possible to estimate from null subcarriers the part of the ICI plus noise energy corresponding to data subcarriers. First, the approximation of the ICI energy, derived in (5), is independent of k. Second, in spite of the colored noise due to the analog bandpass filter, for sufficiently high signal to noise ratio (SNR) level, the ICI term at the null subcarriers is dominant over the noise. Therefore, despite the existence of the colored noise, the estimation of ICI plus noise energy of null subcarriers can be used to approximate that of data subcarriers and hence used in the MMSE equalizer of (8).

By evaluating the energy of those null samples, we can get an estimate of $\sigma_\epsilon^2(m)$ by $$\hat{\sigma}_\epsilon^2(m) = \frac{1}{N_N} \sum_{k \in S_N} |R_m(k)|^2 \quad (13)$$

but not without some estimation errors that may affect the algorithm performance. This will be checked by comparing the analytical results with those obtained through computer simulation.

Based on the foregoing discussion, the post-FFT PNS algorithm is described by the following steps:

1) Obtain the estimate $\hat{I}_m(0)$ of CPE by (11) as well as the estimate $\hat{\sigma}_\epsilon^2(m)$ of ICI plus noise energy by (13);
2) Use (8) to calculate the equalizer coefficients for N samples of each symbol, where the unknown parameters are replaced by the estimated values from step 1;
3) Use (7) to get the estimated signals for data detection. Decision feedback is used to update the estimate of $I_m(0)$ by implementing (12).
4) Go through steps 1-3 until all symbols have been processed.

To judge the computational complexity of the PNS algorithm, we note that, compared with the conventional MMSE equalizer of (10), the PNS algorithm is quite cost effective by requiring only $1+2(N_P+N_D)/N$ extra complex multiplications per sample (subcarrier).

NUMERICAL RESULTS

The PNS algorithm was evaluated for a normalized frequency-selective Rayleigh fading channel by Monte Carlo trials. Six multiple radio paths were chosen for simulation. Channel impulse response remains static within a frame containing 16 symbols, but varies independently from frame to frame. Transmitted data is constructed according to the IEEE 802.11a WLAN standard. The receiver filter is matched to the transmit filter defined in the standard at clause 17.3.9.6.2. 16 QAM, which is more sensitive to phase noise than M-PSK, is used in the simulation to evaluate the performance of the PNS algorithm under the modulation. Phase noise is simulated using an independent Gaussian increment between adjacent samples (subcarriers) as proposed in Robertson et al. op. cit. The forgetting factory equals 0.1. Given phase noise and the AWGN noise, the theoretical values of $I_m(0)$ and $\sigma_\epsilon^2(m,k)$ based on (3) and (5) is calculated to examine the effectiveness of the proposed algorithm. In FIG. 1 simulations results with the PNS algorithm are compared with the theoretical calculation as well as the result obtained with the CPE estimation algorithm of Robertson et al. op. cit. (The reference "[6]" in the legends of FIGS. 1 and 2 is to Robertson et al.)

One might possibly conclude from FIG. 1 that phase noise causes an irreducible error floor of OFDM receiver performance, which is unacceptable in practice. The PNS algorithm, however, exhibits excellent performance. In this regard, it outperforms the CPE estimation algorithm proposed in Robertson et al. op. cit., having the performance that is very close to the theoretical calculation and non-phase-noise case.

From FIG. 2, we note that the proposed PNS algorithm always outperforms the CPE estimation in Robertson et al., op. cit. for different phase noise conditions. It is well known that the variance of phase noise is usually much less than 1 rad$^2$ (or $4\pi\beta T$ is much less than 1 rad$^2$). From FIG. 2, if $4\pi\beta T$ is of the order of $10^{-2}$ or lower, its performance is quite comparable with that of non-phase-noise case.

Thus in accordance with this invention, a new and simple phase noise suppression method is provided which is applicable to for the IEEE 802.11a standard, and which has an outstanding performance when dealing with phase noise. This algorithm used takes advantage of pilot and null samples given in the IEEE 802.11a standard, as well as decision feedback, and successfully suppresses phase noise. It has been shown that this algorithm has much better performance than other algorithms while keeping computational complexity low. The algorithm can be further extended to any OFDM systems.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A method for phase noise suppression in a receiver section of an OFDM based WLAN operating in accordance with IEEE standard 802.11a, comprising:
   RF downconverting and analog-to-digital (A/D) converting the OFDM to provide a baseband OFDM signal;
   performing an FFT on the baseband OFDM signal;
   estimating ICI plus noise from a null subcarrier set $S_N$ extracted from the FFT of the baseband OFDM signal;
   estimating CPE from a pilot subcarrier set $S_P$ extracted from the FFT on the baseband OFDM signal; and
   applying both said estimates in MMSE equalization and data detection of a data sample set $S_D$.

2. A method in accordance with claim 1, wherein performing the FFT further comprises feeding a data stream from the RF down conversion and A/D conversion of the baseband OFDM signal to the FFT, both CPE and ICI being present at the output of the FFT due to phase noise, and said both CPE and ICI estimates being obtained from outputs of said FFT.

3. A method in accordance with claim 2, wherein the estimating CPE further comprises taking the CPE estimate after the MMSE equalization and data detection as a first data decision output providing decision feedback to and further improving the CPE estimate.

4. The method of claim 3, wherein providing decision feedback to further improve the CPE estimate comprises computing $I_m(0)\gamma I_m(0)+(1-\gamma)I_m(0)$, where $I_m(0)$ is the CEP estimate and $\gamma$ is a forgetting factor.

5. A method in accordance with claim 3, wherein said estimates are used to calculate equalizer coefficients for N samples of each transmitted symbol of the OFDM signal.

6. A method in accordance with claim 5, wherein unknown parameters in the equalizer coefficients are replaced by said estimated values.

7. A method in accordance with claim 3, wherein after providing decision feedback to the CPE estimate, outputting a final data decision based on performing the MMSE Equalization and data detection on: the ICI estimate, the data sample set $S_D$ and the improved CPE estimate.

8. The method of claim 1, wherein the ICI estimate plus noise $\sigma_\epsilon^2$ further comprises computing $$\sigma_\epsilon^2 = N_N^{-1} \sum_{k \in S_N} |R_m(k)|^2,$$

where $R_m(k)$ is a kth output of the FFT and N is a number of points in the FFT.

9. The method of claim 1, wherein the CEP estimate $I_m(0)$ further comprises computing $$I_m(0) = \frac{\sum_{k \in S_P} R_m(k) X_m^*(k) H_m^*(k)}{\sum_{k \in S_P} |X_m(k) H_m(k)|^2},$$

where $R_m(k)$ is a kth output of the FFT, $X_m(k)$ is a transmitted symbol and $H_m(k)$ is a channel impulse response and $(\dot{\cdot})^*$ represents a conjugae operation.

10. The method of claim 1, wherein generating the MMSE equalizer output $C_m(k)$ and estimating a transmitted data sample $\hat{X}_m(k)$ further comprises computing $$C_m(k) = \frac{I_m^*(0) H_m^*(k)}{|I_m(0) H_m(k)|^2 + \sigma_\epsilon^2(m)/E_x}$$

and $\hat{X}_m(k) = R_m(k) * C_m(k)$, respectively, where $I_m(0)$ is the CEP estimate, $H_m^*(k)$ is a channel impulse response, $R_m(k)$ is a kth output of the FFT, $\sigma_\epsilon^2$ is an ICI estimate plus noise and $(\dot{\cdot})^*$ represents a conjugae operation.

11. A method for phase noise suppression in a receiver section of an OFDM signal based WLAN operating in accordance with IEEE standard 802.11a comprising:
estimating ICI plus noise from the a null subcarrier set $S_N$ extracted from the OFDM signal; and
estimating CPE from the a pilot subcarrier set $S_P$ extracted from the OFDM signal; and
applying the said estimates in MMSE equalization and data detection of a data subcarrier sample set $S_D$,
wherein the a data stream from RF down conversion and A/D conversion or the OFDM signal is fed as parallel streams for FFT, both CPE and ICI being present at the output of FFT due to fed phase noise, and said estimates being obtained from said FFT output;
wherein the said subcarrier set $S_P$ estimates CPE further comprises taking the CPE estimates taken from after the MMSE equalization and data detection as a first decision and fed back output for providing decision feedback for further CPE estimation to thereby that further improve improves the CPE estimates which proceeds for that MMSE equalization and data detection,
wherein said estimates are used to calculate equalizer coefficients for N samples of each transmitted symbol of the OFDM signal.

12. A method in accordance with claim 11, wherein unknown parameters in the equalizer coefficients are replaced by said estimated values.

13. A method in accordance with claim 11, wherein the estimating CPE further comprises taking the CPE estimate after the MMSE equalization and data detection as a first data decision output providing decision feedback to and further improving the CPE estimate.

14. A method in accordance with claim 13, wherein after providing decision feedback to the CPE estimate, outputting a final data decision based on performing the MMSE Equalization and data detection on: the ICI estimate, the data sample set $S_D$ and the improved CPE estimate.

* * * * *